(12) United States Patent
Movall et al.

(10) Patent No.: US 6,289,405 B1
(45) Date of Patent: Sep. 11, 2001

(54) ADDITION OF SLOT, BACKPLANE, CHASSIS AND DEVICE PARAMETRIC PROPERTIES TO VITAL PRODUCT DATA (VPD) IN A COMPUTER SYSTEM

(75) Inventors: Paul Edward Movall; Thomas James Osten, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/265,394

(22) Filed: Mar. 10, 1999

(51) Int. Cl.$^7$ ................................................ G06F 13/00
(52) U.S. Cl. ................................... 710/104; 710/8
(58) Field of Search .......................... 710/102, 103, 710/104, 8, 10

(56) References Cited

U.S. PATENT DOCUMENTS

| | | | |
|---|---|---|---|
| 5,117,430 | 5/1992 | Berglund | 370/85.1 |
| 5,935,252 | * 8/1999 | Berglund et al. | 713/300 |
| 5,974,474 | * 10/1999 | Furner et al. | 710/8 |
| 6,044,411 | * 3/2000 | Berglund et al. | 710/9 |

FOREIGN PATENT DOCUMENTS

0517403A2   12/1992  (EP) ................. G06F/11/22

OTHER PUBLICATIONS

Berglund; "Method and Apparatus for Correlating Computer System Device Physical Location with Logical Address"; US Patent Application 08/971,687; filed Nov. 17, 1997.

Berglund; "Fail–Safe Communications Network for Use in System Power Control"; US Patent Application 08/912,561; filed Aug. 17, 1997.

* cited by examiner

Primary Examiner—Glenn A. Auve
(74) Attorney, Agent, or Firm—Christopher H. Lynt

(57) ABSTRACT

In an electrical system having a chassis with at least one chassis slot for receiving a chassis electrical device, and at least one connector board with at least one board slot thereon for receiving a connector board electrical device therein, respective memory is provided for storing vital product parametric data associated with the at least one chassis slot, the at least one connector board slot, and the respective electrical devices. The stored vital product parametric data can be accessed by the electrical system to check compatibility.

30 Claims, 8 Drawing Sheets

The Tables below illustrate an example and potential format for PCI backplane slot parametrics.

Bytes 8 - 11 (Parameters[0...31])

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 |
| 0 | 1 | 0 | 0 | 0 | 0 | 0 | 0 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 | 3 |
| CM | M | 0 | UC | BW | 0 | BV | 0 | BC | CT | LS | 0 | 0 | 0 | CH |

FIG. 2A-1

```
==========
PARAMETER 0
==========
```

CM: Concurrently Maintainable Slot, 2 bits

| | |
|---|---|
| 0x0 | No concurrent maintenance for this slot |
| 0x1 | Individually Concurrently Maintainable |
| Others | Reserved |

IM: Imbedded Slot, 1 bit

| | |
|---|---|
| 0 | This is a pluggable slot |
| 1 | This slot's logic is imbedded on the backplane |

UC: Unique Capabilities, 4 bits

| | |
|---|---|
| 0x0 | No unique capabilities supported in this slot |
| 0x1 | IPCS Design Level 1 Support in this slot. |
| Others | Reserved |

FIG. 2A-2

==========
PARAMETER 1
==========

BW: Bus Width, 3 bits

| | |
|---|---|
| 000 | Reserved |
| 001 | 32 bit signalling only (implies 32 bit connector) |
| 010 | 64 bit signalling only (implies 64 bit connector) |
| 011 | 32 or 64 bit signalling capable (implies 64 bit connector) |
| Others | Reserved |

BV: Bus Signal Voltage, 3 bits

| | |
|---|---|
| 000 | Reserved |
| 001 | 5V only |
| 010 | 3.3V only |
| 011 | 3.V signals, 5V tolerant (universal) |
| Others | Reserved |

FIG. 2B-1

=========
PARAMETER 2
=========

BC: Bus Clock, 4 bits

| | |
|---|---|
| 0x0 | Reserved |
| 0x1 | 33 Mhz |
| 0x2 | 66 Mhz |
| 0x3 | 133 Mhz |
| Others | Reserved |

CT: Connector Type, 4 bits

| | |
|---|---|
| 0x0 | Reserved |
| 0x1 | 3.3V PCI Card Edge |
| 0x2 | 5V PCI Card Edge |
| 0x3 | AGP Card Edge |
| Others | Reserved |

FIG. 2B-2

==========
PARAMETER 3
==========

LS: Long Slot, 2 bits

| 00 | Reserved |
|---|---|
| 01 | This slot can support only a PCI long card form factor |
| 10 | This slot can support only a PCI short card form factor |
| 11 | This slot can support a PCI long or short card form factor |

CH: Card Height, 3 bits

| 000 | Only a standard height card is allowed |
|---|---|
| Others | A card has an additional "n" inches in height over the standard PCI card height |

FIG. 2B-3

| (Parameters[4..71]) | | | | | | | | | | | | | | | | | | | | | | | | | | | | | | | | Bytes 12 - 15 | | | | |
|---|---|---|---|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 4 | 4 | 4 | 4 | 4 | 4 | 4 | 4 | 5 | 5 | 5 | 5 | 5 | 5 | 5 | 5 | 5 | 5 | 6 | 6 | 6 | 6 | 6 | 6 | 6 | 6 | 6 | 6 | 7 | 7 | 7 | 7 | 7 | 7 | 7 | 7 | 7 |
| PU | | | | | | | | Reserved = 0x00 | | | | | | | | | | Reserved = 0x00 | | | | | | | | | | Reserved = 0x00 | | | | | | | | |

FIG. 2C

PU = Pitch Units. Pitch is from left to right as viewed from tailstock with card in upright position. Pitch Units in 0.1" increments for the slots.

ADDITION OF SLOT, BACKPLANE, CHASSIS AND DEVICE PARAMETRIC PROPERTIES TO VITAL PRODUCT DATA (VPD) IN A COMPUTER SYSTEM

CROSS-REFERENCE TO RELATED APPLICATIONS

The present application is related to co-pending application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" attorney docket number RO997-154-IBM-108, now U.S. Pat. No. 6,044,411, and to co-pending application Ser. No. 08/912,561, filed Aug. 18, 1997, entitled "FAIL-SAFE COMMUNICATIONS NETWORK FOR USE IN SYSTEM POWER CONTROL" attorney docket number RO997-083-IBM-101, now U.S. Pat. No. 6,122,256, both of which are assigned to the same assignee as the present application.

BACKGROUND OF THE INVENTION

1. Field of the Invention

The invention relates to the field of computer systems, and in particular, to compatibility and related issues, for example, between a computer slot and a candidate device intended to be plugged into that slot.

2. Background Information

Recently it has become common to configure computer systems sing motherboards and/or backplanes having a number of slot connectors (or simply "slots" herein) for receiving a variety of add-on adapter card devices. In many computer systems, input/output (I/O) interfacing and various special purpose circuitry is provided using these add-on adapter cards which conveniently and simply plug-in to standard bus connectors on the main processor motherboard or backplane.

The cards typically have edge connectors with a number of relatively closely spaced metal contacts, on one or both sides of the card edge, and the corresponding slots similarly have a like number of closely spaced metal contacts therein. When the card edge connector is inserted in the slot connector, the corresponding contacts make electrical connection. Through these contacts and their electrical connection, the card device and the board system, e.g., a personal computer, communicate data, address and control signals, for example. The card device also generally obtains electrical energy from the personal computer system through two or more of the contacts.

A variety of adapter/connector/bus types and standards are known, and one of these is the peripheral component interconnect (PCI) standard. The PCI bus is a synchronous, processor independent, 32- or 64-bit bus that functions similarly to a processor local bus. The PCI bus can be thought of as a buffered intermediate or so-called mezzanine bus, that is, an extension of the processor local bus. It is coupled to the personal computer processor local bus by so-called "bridge" circuitry, but maintains its own separate set of circuits. The original PCI bus specification provided for a clock speed of 33 MHz, which provided a data transfer rate of 80–120 Mbs (million bytes per second) in a 32-bit environment (32-bit data bus width), and up to a 264 Mbs transfer rate in a 64-bit environment. The PCI bus operates on 5 volts, 3.3 volts, or both.

Other standard types include ISA (Industry Standard Architecture—8/16 bits) and EISA (Expanded ISA—32 bits), SCSI (Small Computer System Interconnect), MCA (Micro Channel Architecture), VLB (VESA—Video Electronics Standard Association—Local Bus), AGP (Accelerated Graphics Port), and USB (Universal System Bus), to name just a few of 15 the more prominent. The newer bus types generally have higher bus speeds. For comparison purposes, the bus speeds can be referenced by the quantity of data transferred per second. The original IBM PC (IBM is a registered trademark of International Business Machine Corporation) had a bus speed of about 1 megabyte per second, the IBM AT about 4 megabytes per second, a typical ISA bus about 8 megabytes to a maximum of 16 megabytes per second, the EISA bus has 32 megabytes per second, the MCA bus 20–40 megabytes per second, the VESA VL-1 has 20–132 megabytes per second, the VESA VL-2 up to 264 megabytes per second, the 33 MHz PCI version 1.0 (32-bit) has 80–120 megabytes per second and the PCI version 2.0 (64-bit) up to 264 megabytes per second, as noted earlier.

Bus speeds are alternatively quantified by their clock frequency, e.g., in mega-Hertz (MHz). The trend is for bus speeds to increase. PCI bus speeds, for example, are now available at an operating speed of 66 MHz. Even higher bus speeds, e.g., 133 MHz, and bit widths, e.g., 128 bits, are inevitable. Motherboards with 100 MHz processor bus speeds are currently available in high-end personal computers (PC's), such as those using 450 MHz Pentium II processors. As processor and motherboard speeds increase, increased performance demands will be put on peripheral devices and their buses.

However, not withstanding standardization efforts, due in large part to technological advances, there are currently a variety of systems in use having different specifications, such as bus type and bus speed. An office network installation may have brand new PC's operating with 100 MHz processor bus speeds along side systems only a year or two old operating with 33 MHz or 66 MHz processor bus speeds. Similar differences in peripheral devices and their busses naturally also exist.

There may be older, so-called legacy devices, which use older interface technology, but which still have a considerable amount of useful life remaining. These legacy devices may represent a considerable capital and labor investment. For this reason, systems are sometimes designed to incorporate two or more peripheral bus standards on a single motherboard, e.g., PCI and EISA. It would not be unusual to encounter a system having a primarily PCI-based motherboard with an embedded PCI based video driver, PCI slots with network interface and/or modem cards, a parallel/serial interface card for mouse and printer, an on-board keyboard interface, an embedded USB bus interface, an embedded IDE bus for connecting to IDE based hard drives, an embedded floppy drive bus, one or more EISA slots with a legacy sound card, and having an SCSI interface card plugged-in for interfacing with an SCSI based scanner, for example.

Of course, there may be other reasons why slower bus speed systems and devices are still being configured, such as tradeoffs between cost and speed, for example.

Besides bus type and bus speed mentioned above, variations in the operating voltage levels provided, e.g., 3.3 volts versus 5 volts and/or 12 volts, also raise compatibility issues. Systems may be further differentiated by their bus/slot bit-width, e.g., 8-bit, 16-bit, 32-bit or 64-bit. For example, PCI busses include both 32-bit and 64-bit versions. Also, on some PCI motherboards, some of the PCI bus slots may be designated for bus master devices and some for bus slave devices.

There can also be differences in the available width, length or height clearance for card-slot electrical devices among the various available peripheral connectors and computer systems, depending on board layout, etc.

For example, the PCI standard supports both a long card form factor and a short card form factor. However, a particular system configuration may only permit a short card in a particular slot because of a lack of clearance with other installed system devices. That is, the may not be enough room for a long card in a particular slot. There may also be height clearances to consider for card devices that exceed the standard card device height. Cooling requirements may also be a factor in determining where a particular card device is or can be located in a particular system, as could electromagnetic field or other electrical interference issues, e.g., RFI (radio frequency interference). The preceding parameters are examples of what is referred to herein as "parametrics." Information about these parameters is referred to herein as "parametric data." (A parameter could be represented simply as a bit whose state indicates the parameter's value, such as in the long/short card form factor parameter mentioned above.)

It is further noted that some systems may have chassis slots for power supplies or cooling systems, for example, in addition to the backplane/motherboard slot connectors, whose parameters may affect system compatibility. Some power or cooling subsystems may be packaged in drawers which are designed to be inserted into and removed from a chassis slot as a unit, for example.

One the one hand, all the variety described above provides user choice and flexibility. On the other hand, when the various technologies need to be integrated, significant compatibility issues may frequently be presented.

It should be apparent that, even in systems which use "standard" PCI slots, for example, there are any number of situations where "compatibility" questions between a computer slot and a candidate device can arise. Examples of some of the more common situations where such issues must be addressed will now be described.

A computer user might "surf the Web" browsing for a new PCI I/O adapter card to plug into a target computer slot, for example, a slot on a backplane in an IBM AS/400 computer system (IBM and AS/400 are trademarks of International Business Machines Corporation, all rights reserved). Before purchasing and installing the adapter card, the user needs to be sure they will be compatible. The adapter card and the computer system will generally (but not always) come with associated marketing literature and various other documents, e.g., technical specifications (specs), listing all the pertinent attributes and parameters (also called "parametrics" herein) needed to determine if the device and slot are compatible. For example, the user may be concerned whether the computer system backplane PCI slot can support the bus speed specified for the adapter, e.g., 66 MHz.

However, it may be the case that the computer system PCI backplane has been swapped out with an upgraded version, for example, and therefore the original computer system documentation the user has is no longer accurate. The user may have lost or misplaced any documentation that came with the upgraded board. In such a situation, the computer user may have difficulty finding out whether the new backplane's bus speed parameter for the PCI slot can support the candidate PCI adapter device's bus speed.

As another example of a problematic compatibility question, suppose the computer user considering new I/O adapters has seven different computer towers (towers being separate enclosures which may contain one or any number of processing elements, backplanes and peripherals) all attached, e.g., operatively interconnected to form a multiprocessor system. The seven computer towers could have seven or more different types of PCI backplanes installed. The computer user would have to gather together all the tower documentation to figure out how many PCI slots of the following representative connector types are available: 33 MHz—32 bit—5 Volt connectors; 33 MHz—32 bit—3.3 Volt connectors; 64 bit—33 MHz—5 Volt connectors; 64 bit—33 MHz—3.3 Volt connectors; 32 bit—66 MHz—3.3 Volt connectors; or 64 bit—66 MHz—3.3 Volt connectors.

Another example would be if a computer user has purchased a new DASD (direct access storage device) to plug into the computer. The computer user may know by looking at existing configuration records, for example, that there are five empty DASD slots available. However, the computer user would also like to know without the need of taking the back cover off of the computer, which empty slots in this computer have 1.6" width spacing, required to accommodate the new DASD. It is typically the case in this particular computer system that there are mostly 1.0" spaced DASD connectors on the backplane.

Another example would be where a computer user is considering upgrading to a new power supply which is smaller in size, but more powerful in output wattage. The associated literature states that the old power supply was not "hot-pluggable," which means it was not concurrently maintainable, i.e., it could not be serviced or replaced while the computer system was running. This may have been because, for example, a chassis slot opening was too small to accommodate an effective latch retention and removal mechanism to facilitate concurrent maintenance. However, the computer user would like to know whether the smaller power supply once installed in the system could be concurrently maintained, which might be a decisive advantage in making the decision to upgrade.

As another example of a problematic compatibility question, assume a DASD has just been concurrently plugged into a computer slot, that is, while the computer system is running. Prior to the I/O subsystem configuring and formatting this newly installed DASD, it would be desirable for the SCSI (Small Computer System Interconnect) bus controller to be able to read the capability of the DASD slot where the new DASD has just been plugged, in case, for example, system operating efficiency is thereby threatened. An example of this would be where the operator plugged a Single Ended (SE) DASD device into a backplane bus that is otherwise capable of higher speed differential bus activity. In such a case, assuming that prior to the installation of the new DASD, all the other DASD's on the SCSI bus were running in the faster differential mode, the entire SCSI bus would be disadvantageously slowed down to accommodate the slower SE DASD.

As a further example, assume a corporate computer user has hundreds of various "WINTEL" computers (Intel processor based computers running the Windows operating system), PC's, workstations, and servers, and wants to upgrade the processors, for example, in all of them. Before contacting a $100/hour and up computer consultant, the user wonders whether some advance work could be done to prepare for the meeting with the consultant. This computer user would like to know, for example, how many 'Embedded', 'Socket 7', 'Socket 8', 'Slot 1', 'Slot 2' and 'Slot M' processors there are, and how much power is delivered to each of these processor connector-types, so that the upgrade options and costs can be more readily determined. The original documentation for these computers may not have been retained, or may not even have provided this information. Clearly, manually opening and checking each computer could be very time consuming.

As another example, assume a computer complex system error log has indicated a particular LAN (Local Area Network) is having many 'timeout' problems, i.e., operations are not being completed within allotted time limits, and these are usually occurring on two older machines (computers) attached to the network. The System Administrator (SA) is debating whether to ask Management to update the problematic machines with one or more newer computer systems. Before doing that, the SA wonders whether all that is needed is a new Ethernet (a network type) controller. The SA would like to know whether the 'slot' assigned to the Ethernet controller actually represents an embedded Ethernet device, i.e., the Ethernet device is integrated on a system board as opposed to being a removable, e.g., slot-type, device, however, the old computer system documentation may be missing or incomplete. The SA would like to know because if the Ethernet controller is an embedded device, then the whole system board (backplane) would have to be replaced to test the theory that the problem is the controller. The cost of replacing that backplane could tip the balance toward buying the new computers, for example. If the controller is a removable device, then the replacement cost to perform the test would be trivial.

The above examples could be classified into a number of different categories of compatibility issues, as follows. In the first example, an electrical property and parameter (i.e., bus speed) of both the device and the backplane are the issue. In the second example, the physical connection parameter (PCI slot speed/voltage) is the issue. In the third example, the required physical spacing between slots is the issue. In the fourth example, concurrent maintenance and usability is the issue. That is, the possible new 'capabilities' of the slot based on characteristics of the device are at issue. In the fifth example, the PCI subsystem performance, and whether it will be adversely affected, is the issue.

The sixth example, dealing with the processor socket type, is similar to the first example, in that electrical properties (of the backplane and the possible upgrade processors) are at issue. The last example relates to PAR (Problem Analysis and Resolution) actions which need to be facilitated.

From the above examples, it can be seen that there are a number of compatibility and related issues which computer users may be faced with from time to time. As has been shown, at present, resolving these issues, if even possible, can be costly and time consuming. Presently, users have to rely on written documentation or limited on-line "help" tools.

Published European Application EP-0-517-403-A2 (published Dec. 9, 1992) describes a "Diagnostic system for a personal computer." On page 6 of this EP document, and with reference to FIGS. 1, 2 and 3, it is stated that VPD information for a particular product "is read from the product ROM into VPD 92 when the system is first powered up after the product adapter has been installed." The text goes on to list the particular VPD information provided. However, the system described in the EP document does not provide parametric information, a specific type of VPD, such as is described herein below, to be coordinated with chassis VPD.

A system power control network (SPCN) is known from U.S. Pat. No. 5,117,430, and from co-pending application Ser. No. 08/912,561, filed Aug. 18, 1997, entitled "FAIL-SAFE COMMUNICATIONS NETWORK FOR USE IN SYSTEM POWER CONTROL" attorney docket number RO997-083-IBM-101. The SPCN communications network is a low volume serial network used to monitor power conditions at a plurality of nodes in a computer system, for example, the IBM AS/400 (IBM and AS/400 are registered trademarks of International Business Machines Corporation). The nodes typically include microprocessors which monitor the status of, and make occasional adjustments to, the power conditions at the respective nodes.

It is further known to store vital product data (VPD) for correlating the physical locations of system components with their corresponding logical addresses in a computer system, for example, from co-pending patent application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" assigned to the same assignee as the present application. As described therein with respect to an exemplary embodiment, memory, e.g., non-volatile memory, is provided on a PCI backplane and written with VPD product information, such as the type of backplane, manufacture date, backplane serial number, type of slots on the backplane, etc., and this information is retained for use by the operating system if and when needed for service action, upgrades, or for on-line configuration management and order process.

Further, the VPD information may advantageously be written and accessed, for example, using a system power control network, such as an SPCN disclosed in the above-mentioned U.S. Pat. No. 5,117,430 or in the other related co-pending application Ser. No. 08/912,561.

From the previous discussion, it can be seen that a need has existed for an enhanced way of resolving compatibility and related issues such as those described above, so that computer users may avoid and/or resolve technical issues, such as compatibility problems, more efficiently.

SUMMARY OF THE INVENTION

It is, therefore, a principal object of this invention to provide a method and apparatus for facilitating the resolution of compatibility and related issues.

It is another object of the invention to provide a method and apparatus that solves the above mentioned problems so that compatibility and related questions are easily resolved without resort to written documentation.

These and other objects of the present invention are accomplished by the method and apparatus disclosed herein.

The present inventors recognized that a computer user confronted with the type of compatibility and related problems described above could benefit from an enhancement of the VPD described in the related co-pending application Ser. No. 08/971,687, mentioned above.

According to an aspect of the invention, the addition of slot, backplane, chassis and device parametric properties, for example, to vital product data (VPD) stored in and accessible by a computer system, facilitates overcoming the problems set forth above.

According to an aspect of the invention, in an electrical system having a connector board with at least one electrical connector thereon for receiving an electrical device therein, a method includes storing vital product parametric data in memory associated with the connector board. The stored vital product parametric data can be accessed when information about the connector board and/or an electrical device therein is needed. The storing vital product parametric data includes storing information about characteristics of the connector board and the at least one electrical connector. For example, storing physical and electrical characteristics of the connector board and the at least one connector.

According to another aspect of the invention, there are a plurality of connectors on the connector board, and the storing physical characteristics includes storing a respective associated connector clearance for each of the plurality of connectors.

According to another aspect of the invention, there are a plurality of connectors on the connector board, and wherein the storing physical characteristics includes storing a respective associated number of connector contacts for each of the plurality of connectors.

According to another aspect of the invention, there are a plurality of connectors on the connector board, and wherein the storing physical characteristics storing a respective associated connector type for each of the plurality of connectors. The connector type could be peripheral component interconnect (PCI), industry standard architecture (ISA), expanded industry standard architecture (EISA), small computer system interconnect (SCSI), micro channel architecture (MCA), video electronics standard association local bus (VLB), accelerated graphics port (AGP), or universal system bus (USB), for example.

According to another aspect of the invention, there are a plurality of connectors on the connector board, and wherein the storing electrical characteristics includes storing a respective associated connector bit-width for each of the plurality of connectors. The bit-width could be 8, 16, 32, 64, or 128 bits, for example.

According to another aspect of the invention, there are a plurality of connectors on the connector board, and wherein the storing electrical characteristics includes storing a respective associated connector bus speed for each of the plurality of connectors. The bus speed could be, for example, 33, 66, or 133 MHz.

According to another aspect of the invention, there are a plurality of connectors on the connector board, and the storing of electrical characteristics includes storing a respective associated connector voltage and amperage for each of the plurality of connectors. The voltage could be 3.3, 5 or 12 volts, for example, and the amperage capacity 10 mA, 100 mA, 1 Amp or 10 Amps, for example.

According to another aspect of the invention, there is at least one electrical device coupled to a connector on the connector board or chassis, and the method includes storing vital product parametric data associated with the electrical device in memory associated with the electrical device. The stored vital product parametric data associated with the electrical device can be accessed when needed. The stored vital product parametric data may include information about physical and/or electrical characteristics of the electrical device, such as concurrent maintenance operating capabilities, for example. Backplane or chassis VPD can contain information about the capabilities of the device that is allowed or can be plugged into it.

According to another aspect of the invention, the electrical system includes a chassis with at least one chassis slot for receiving an electrical chassis device therein. A chassis device includes, for example, a power supply or a cooling fan. The method further includes storing vital product parametric data in memory associated with the at least one chassis slot, and accessing the stored vital product parametric data with the electrical system. The electrical system could be a computer having an operating system.

These and other aspects of the invention will become apparent from the detailed description set forth below.

BRIEF DESCRIPTION OF THE DRAWINGS

FIGS. 2A-1, 2A-2, 2B-1, 2B-2, 2B-3, and 2C illustrate an example and potential format for PCI backplane slot parametrics according to an exemplary embodiment of the invention.

DETAILED DESCRIPTION OF THE PREFERRED EMBODIMENT(S)

Figure 1A:
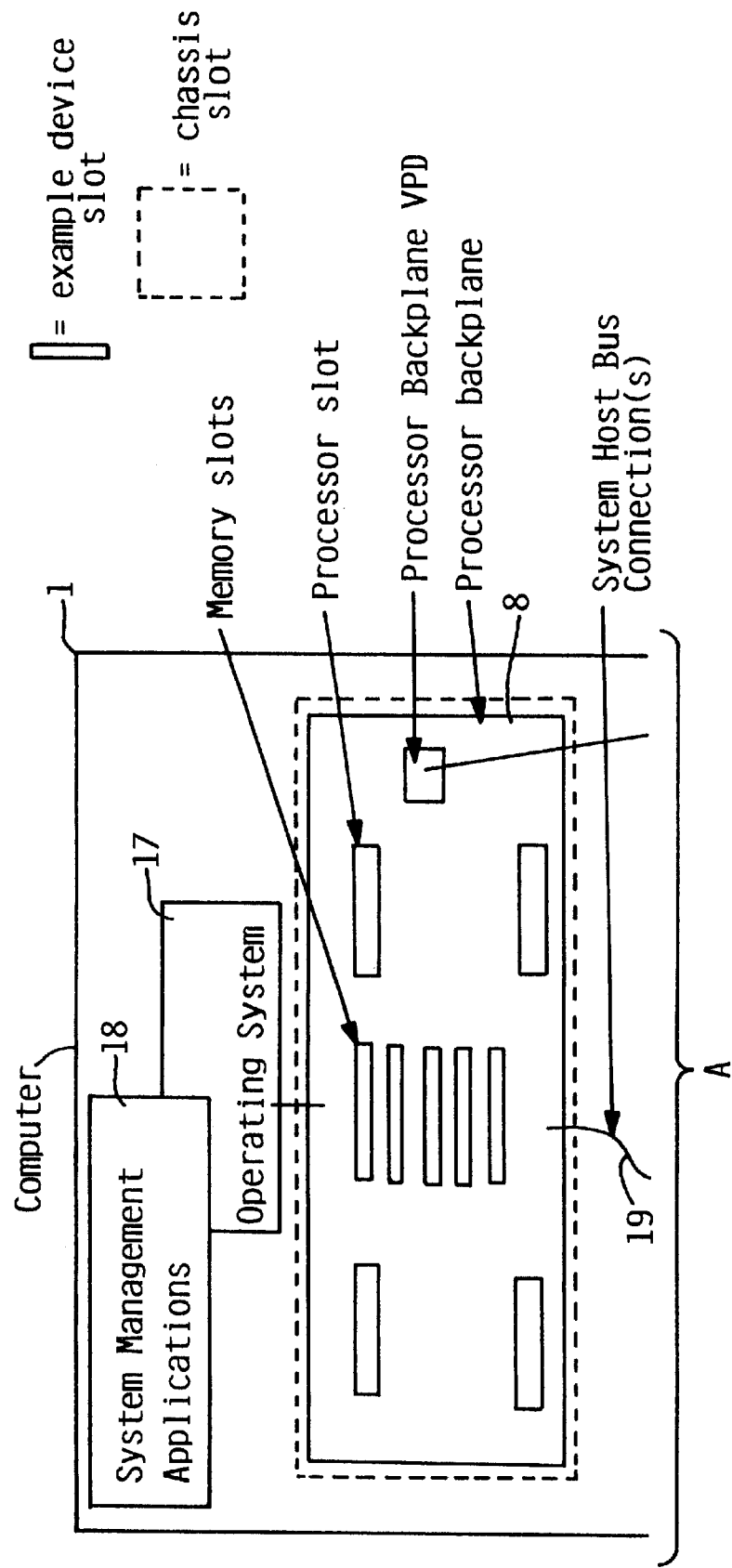
FIGS. 1A and 1B illustrate a computer provided with a vital product parametric data system according to an exemplary embodiment of the present invention.

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

The invention advantageously enables 'compatibility checking' between a computer connector (slot) and a candidate device intended to be plugged into that slot, for example. This enablement is accomplished by comparing physical and electrical properties stored in the form of parametric data in memory (i.e., VPD—Vital Product Data) located on a backplane, chassis and/or candidate device. Compatibilities of these computer components are compared against each other and/or against an a priori knowledge of the computer system's configuration and capability. There are actually two similar but different concepts being disclosed.

A 'slot' as the term is used here can be either a single connector location for an electrical device (such as a processor, memory, DASD, tape, power supply, fan, or I/O Adapter, such as a PCI card, or bus adapter, etc.), and/or a 'slot' could also be a location for an entire subsystem backplane, which is in this context a 'device', within a larger computer chassis.

A subsystem backplane can be characterized as a group of one or more device connectors, e.g., slots, on a system connector/circuit board. An electrical device and a backplane are pluggable components and can include various attached hardware required for mounting and connecting the component in the respective slot.

The situations presented in the Background section where a compatibility issue between a device and a computer is raised are solved according to embodiments of the invention, as will now be explained:

Example 1

This is the situation where a computer user is surfing the World Wide Web and looking at a new PCI adapter card to plug into a computer slot. However, the original PCI slot backplane has been swapped out with an upgraded version and the documentation the user has is no longer accurate.

With the present invention, it is possible to connect to a site on the World Wide Web (WWW) and query the computer system's PCI slot backplane VPD chip to find out whether the backplane's 'speed' parametric on the slot can support the PCI adapter's 66 Mhz bus speed. The WWW query may be an automatic operation, the user may manually look up the information from an on-line data base, or it may be a combination of manual and automatic, that is, some operations are done manually and others automatically.

For instance, the system administrator may require an additional Ethernet card device. The particular computer model involved would be manually looked up at a Web site catalog, and a potentially suitable Ethernet card found and selected. From the Ethernet card description, it can be ascertained that it the card is a 66 MHz adapter, for example. Next, an automatic Web-based application can be invoked that will connect with the particular computer involved, have the computer query its PCI backplane slot capabilities, and return that information to be checked for compatibility with the target adapter.

If the system administrator has the particular Ethernet card in hand and is about to do a concurrent maintenance action, a concurrent maintenance program (CM task) could ask for the Ethernet card part number to be input. The CM task could then initiate a Web task to query the Ethernet card catalogue parametric data and also coincidentally have the CM task query the backplane slots and create a list of compatible slots.

Further, once the adapter is plugged, the operating system (OS) can double check both the adapter and the backplane's 'speed' parametric to ensure compatibility before proceeding to full operation.

Example 2

In this scenario, the computer user has seven different computer system towers all attached together, and all the towers have different types of PCI backplanes installed. The computer user wants to find out how many and what type of connectors, i.e., what bit-width, speed, voltage, etc., are available, for use with new I/O adapters being considered.

According to an aspect of the invention, the Operating System (OS) queries all the backplanes' VPD chips for the slot information. An application program can be spawned to display the types of slots available to the user.

Example 3

In this example, the computer user has purchased a new DASD device requiring a 1.6" spacing to plug into the computer system. There are five empty DASD slots available, but the user needs to know which slots have 1.6" spacing or which slots have an empty slot next to them (which allows a 1.6" device) in this computer system. The 1.0" pitch slots accept the 1.6" device, but when plugged, the 1.6" device 'covers-up' the adjacent 1.0" connector position.

Instead of pulling off the computer boxes back covers, or referencing documentation, according to an aspect of the invention, the computer user can query the backplane VPD 'slot-pitch' parametric to identify the optimum location to plug the 1.6" DASD device, and this can be performed through the OS, for example.

Example 4

In this example, the computer user is upgrading to a new power supply. The old power supply was not 'hot-pluggable' because the chassis slot opening was too small to accommodate an effective latch retention and removal mechanism. The user wants to know if the new power supply is a smaller power supply which can now be concurrently maintained.

According to an aspect of the invention, the new power supply VPD can be queried to find out if it is a smaller power supply, and whether it also has its customer serviceable unit (CSU) bit set. Then the system can update its chassis VPD for the power supply 'chassis-slot' and change the 'NCM' (NOT Concurrently Maintainable) parametric bit to 'CM' after the appropriate CM mounting hardware is added to the chassis slot. The computer now has the proper hardware system image and future users can then query the 'chassis-slot' VPD and determine that the new power supply and slot are concurrently maintainable.

Example 5

In this example a DASD has just been concurrently plugged into a computer slot. Prior to the I/O subsystem configuring and formatting this newly installed DASD, it would be desirable for the SCSI controller to read the capability of the DASD slot where the new DASD has just been plugged, in case, for example, system operating efficiency is thereby threatened. For example, if a Single Ended (SE) DASD device was plugged into a backplane that is otherwise capable of higher speed differential bus activity. In such a case, assuming that prior to the installation of the new DASD, all the other DASD's on the SCSI bus were running differential and therefore faster, the entire SCSI bus would be disadvantageously slowed down to accommodate the slower SE DASD.

According to an aspect of the invention, the DASD backplane slot VPD can be read and an error or warning condition can be posted to the Operating System if this is not an 'optimum' match, e.g., if the operator plugged an SE DASD device into a backplane capable of differential bus activity. The OS can be warned that the entire bus has now slowed down to accommodate the slower SE device.

Example 6

In this example, the computer user has hundred's of various WINTEL PC's, Workstations, and Servers and wants to upgrade all of them, and wonders how many 'Embedded', 'Socket 7', 'Socket 8', 'Slot 1', 'Slot 2' and 'Slot M' processors there are and how much power is delivered to each of these processor connectors.

According to an aspect of the invention, the computer user can execute a System Management Application to query the slot VPD and print out the slot parametrics for 'slot-type' and 'power' on all these platforms.

Example 7

In this situation, the computer complex system error log says a particular LAN network is having many 'timeout' problems which usually occur on two older machines. The System Administrator wonders whether all that is needed is a new Ethernet controller.

According to an aspect of the invention, the System Administrator can query the backplane slot VPD to find out if this 'slot' is really an embedded Ethernet device and that the whole system board would have to be replaced to test the theory.

It should be apparent that, in the above examples, there are a number of different types of compatibility issues being solved according to different aspects of the invention, as will be explained.

In the first example, where the issue is whether a new PCI adapter card is compatible with a particular backplane, an electrical property and parametric (bus speed) of both the device and the backplane are being examined.

In the second example, where there are seven different computer towers with different backplanes and new I/O adapters are being considered, the physical connection parametrics (connector bus speed, bit-width and voltage level) are being examined for compatibility with the new adapters.

In the third example, where a new DASD which requires 1.6" spacing is being considered, the physical spacing parametric defining the available space between connector devices is being considered.

In the fourth example, involving the new power supply, concurrent maintenance (CM) and customer serviceability (CSU) questions are being answered. Also, in this example the slot VPD is updated automatically to reflect the new 'capabilities' of the slot based on characteristics of the device itself, i.e., concurrent maintenance capable and/or customer serviceable.

In the fifth example, involving SCSI bus controller querying the capabilities (single-ended or differential) of a new DASD on its SCSI bus, the SCSI I/O subsystem is doing its own automatic query (apart from the OS) and perhaps warning the OS that the I/O subsystem performance will now be adversely impacted. The OS can then 'question' whether a SE DASD device should be allowed to continue to be configured (formatted), for example. In this example, as in the third example, the system could also read out a device parametric that says whether it is a 1.6" DASD and compare it to the backplane slot parametric that says it was just plugged into a 1" spaced slot. In such a case, the configuration could be stopped after firmware warned the OS that a 1.6" DASD is now covering up an adjacent 1" slot and the OS thinks there is a better (1.6") slot for it to reside in. The service personnel could be instructed to move the DASD to a more appropriate slot location.

The sixth example, relating to workstation upgrading issues, is another example similar to the first example, where an electrical property and parametric of both the device and the backplane are being examined, i.e., processor socket connections and power requirements.

The last (seventh) example, relating to the LAN timeout error theory resolution, shows how the 'slot' VPD information can help in mapping a course for PAR (Problem Analysis and Resolution) actions. Completely different PAR actions are required depending on whether the LAN device is embedded or in the form of a removable device.

Figure 1B:
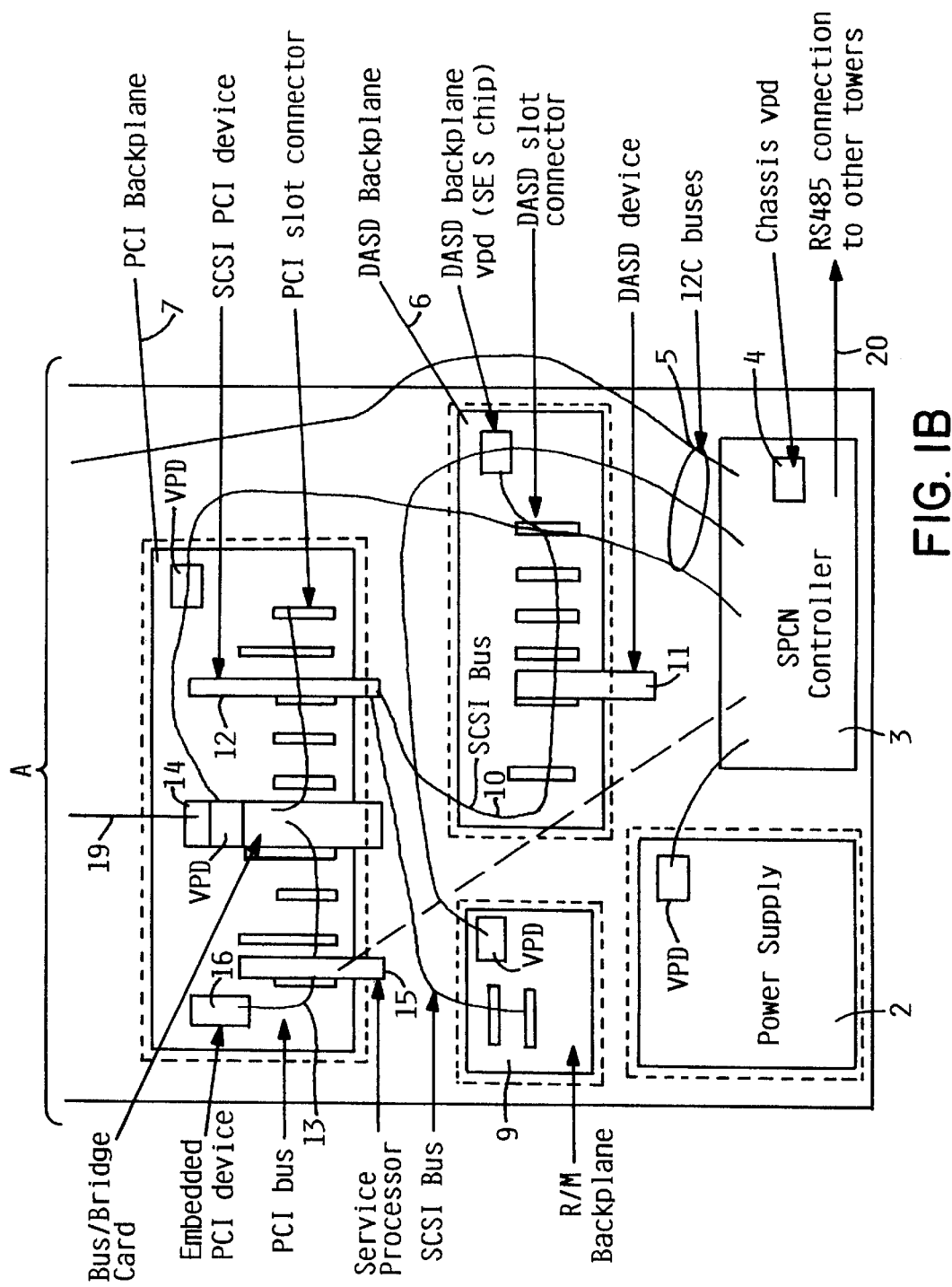

FIGS. 1A–1B illustrate an exemplary computer system in which an embodiment of the invention is practiced. The system has a number of VPD chips, e.g., backplane VPD chips, and illustrates the addition of the above described parametrics to the VPD of a PCI card (for instance). It also illustrates the components of the system utilizing (and modifying when necessary) this VPD for System Management purposes.

In more detail, FIGS. 1A–1B show a computer enclosure/system 1 having a power supply 2, an SPCN controller 3 with chassis VPD chip 4, and a number of other devices having VPD chips interconnected by an I2C bus system 5.

In particular, there is shown a DASD backplane 6, a PCI backplane 7, a processor backplane 8, and an R/M (Removable Media) backplane 9. The DASD backplane 6 has an SCSI bus 10 interconnecting DASD slots connectors, one of which has a DASD device 11 therein. The DASD backplane VPD memory is provided by an SES chip.

The SCSI bus 10 is interfaced to the PCI backplane 7 by an SCSI PCI adapter device 12. A PCI bus 13 interconnects a number of PCI slot connectors on this backplane 7. A bus/bridge card 14 interconnects the backplane PCI bus 13 with the system host (processor) bus 19 on the processor backplane 8. Also on the PCI backplane 7 is a service processor card 15 used to initialize the CEC (Central Electronics Card) components (processor/memory)

The PCI backplane 7 has an embedded PCI device 16, such as the Ethernet controller in example 7 above. The SCSI bus 10 also connects to the R/M backplane slots.

The processor backplane 8 has the host bus, memory slots, one or more processor slots, etc., and implements the Operating System and System Management Applications shown in block diagram form as blocks 17 and 18. Hard-coded chassis, backplane, and/or device parametrics may be stored in the operating system 17 for comparison with parametric data from and external source, such as a web site (not shown), or VPD parametric data stored in a plugged electrical device.

As is evident from the figure, each backplane 6, 7, 8 and 9, is provided with its respective VPD storage chip. The power supply 2, a socalled chassis device, is also provided with a VPD storage chip. Although not shown, advantageously, other electrical; devices (e.g., cooling fans, and peripherals) would have VPD memory the contents of which would be up-loaded to the operating system for access when needed by the system. The SPCN controller 3 interfaces with all of the VPD chips, and has thereon the chassis VPD chip 4 having chassis specific memory for storing chassis slot vital product data accessible by the computer operating system. The chassis specific memory could alternatively be provided at the computer system operator panel (not shown) or at the service processor 15, or another location associated with the chassis 1, as would be apparent to one skilled in the art. Through a bus 20, e.g., an RS485 serial bus, other SPCN nodes in other computer enclosures are interconnected.

Chassis slots, e.g., power supply slot 21 with power supply 2 therein, are shown in dotted/dashed lines, while backplane device slots, e.g., PCI slot connector 22, are shown in solid lines. The illustrated backplane slot spacing (not to scale) represents the pitch between connectors for devices, such as direct access storage devices (DASD's) and PCI card devices.

FIGS. 2A-1, 2A-2, 2B-1, 2B-2, 2B-3 and 2C illustrate an example of one possible format for PCI backplane slot parametric data according to an exemplary embodiment of the invention in tabular form. The tables are essentially self-explanatory. In the example, FIGS. 2A-1, 2A-2, 2B-1, 2B-2 and 2B-3 show bytes 8–11 for parameters 0–3, and their description. The first parameter, parameter 0 is defined as containing a concurrently maintainable indication (CM), an imbedded slot indication (IM) and a unique capabilities indication (UC). Parameter 1 is defined (FIG. 2B-1) as containing a bus width indication (BW), and a bus voltage indication (BV). Parameter 2 is defined as containing a bus clock indication (BC) and a connector type indication (CT). Parameter 3 is defined as containing a long slot indication (LS) and a card height indication (CH).

FIG. 2C shows bytes 12–15 for parameters 4–7. Parameter 4 is defined as Pitch Units (PU), while parameters 5–7 are reserved for future definition in this example.

The above are representative of the type of PCI backplane slot parametrics which could be provided, and are presented for explanation purposes. The parametrics actually used in any implementation would depend on the particular needs of the system, as would be appreciated by one skilled in the art. It should be apparent that the vital product parametric data could be organized in fixed bit positions, i.e., so that a particular group of bits has a predefined or standard association with a particular parametric, or could be organized in any number of different ways. Using a fixed position regime has advantages in memory savings, for example, but reduces the flexibility and interchangeability among differing systems unless a standard format becomes accepted. However, the invention contemplates that the parametric data may be stored in any way desirable to achieve the general object of facilitating the resolution of compatibility and related issues.

Examples of representative DASD backplane parametrics which could be included PU's (Pitch Units), e.g., 1.6 inches vs. 1.0 inches, which provide an indication of the cross-slot (width-wise) spatial extent of the DASD, BF/BW (Bus Frequency/Bus Width) supported, e.g., Fast (10 MB/s), Fast/Wide (20 MB/s), Ultra (40 MB/s), Ultra2 (80 MB/s), etc., and the type of SCSI bus, e.g., Parallel SCSI, FC-AL, or SSA, for example.

Additional examples of possible parametric VPD corresponding to physical characteristics of devices, backplanes, chassis and their slots include pitch and weight units, cooling capacities for fan FRU's (field replaceable units) and fan slots (not shown in FIGS. 1A–1B), and connector and cable types, as well as voltage/amperage ratings for chassis components and backplanes.

It should also be apparent that there are a variety of other parametrics which could advantageously be accommodated. For example, a power supply chassis slot may only have 15 linear feet per minute (LFM) cooling available as indicated by the chassis VPD, but a target power supply requires 30 LFM as indicated by its device VPD. Such an incompatibility could be detected according to the invention. In this case, of course, target power supplies would be provided with, or retrofitted with, device VPD memory to contain the desired parametrics, as shown in FIGS. 1A–1B. Of course, the system will keep track of what VPD is stored where, so that the corresponding VPD parameters are compared. In the above example, the LFM parameter of the power supply device VPD and the LFM parameter of the chassis slot VPD, which should be compared for compatibility, may be referred to as "complimentary VPD."

In an ideal configuration, the chassis and all devices and backplanes in a system would carry parametric VPD according to the invention. The chassis VPD would be compared with the backplane VPD, the chassis VPD would be compared with the device VPD, and the device VPD would be compared with the backplane device slot VPD to detect compatibility issues.

Preferably, both the VPD for the backplane and the VPD for the backplane device slots are stored on one memory device, e.g., EEPROM, disposed on each backplane, while the chassis VPD is stored in memory dedicated to the chassis, i.e., the system power control network (SPCN) memory in the case of an IBM AS/400 computer system, for example. Device VPD is preferably stored in circuitry on the device itself.

Querying computer interconnections for compatibility according to the invention enables best-of-breed operating system (OS) and application software to be written to optimize how a computer is configured, ordered, and serviced, for example.

Problem Analysis and Resolution (PAR) is also enhanced since the system interconnect and other technical capabilities can be reviewed without removing system covers, and this can be accomplished remotely.

Also, the time to market for systems employing the invention can be reduced, since the software components used to manage system configuration do not require modifications for new configuration.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. In an electrical system having a connector board with at least one electrical connector thereon for receiving an electrical device therein, a method comprising:

storing vital product parametric data in memory associated with the connector board; and accessing the stored vital product parametric data with the electrical system.

2. The method according to claim 1, wherein the storing vital product parametric data comprises:

storing information about characteristics of the connector board and the at least one electrical connector.

3. The method according to claim 2, wherein the storing information comprises:

storing physical and electrical characteristics of the connector board and the at least one connector.

4. The method according to claim 3, wherein there are a plurality of connectors on the connector board, and wherein the storing physical characteristics comprises:

storing a respective associated number of connector contacts for each of the plurality of connectors.

5. The method according to claim 3, wherein there are a plurality of connectors on the connector board, and wherein the storing physical characteristics comprises:

storing a respective associated connector type for each of the plurality of connectors.

6. The method according to claim 5, wherein the connector type is selected from the group including:

peripheral component interconnect (PCI);

industry standard architecture (ISA);

expanded industry standard architecture (EISA);

small computer system interconnect (SCSI);

micro channel architecture (MCA);

video electronics standard association local bus (VLB);

accelerated graphics port (AGP); and universal system bus (USB).

7. The method according to claim 3, wherein there are a plurality of connectors on the connector board, and wherein the storing electrical characteristics comprises:

storing a respective associated connector bit-width for each of the plurality of connectors.

8. The method according to claim 7, wherein the bit-width is selected from the group including:

8 bits;

16 bits;
32 bits;
64 bits; and
128 bits.

9. The method according to claim 3, wherein there are a plurality of connectors on the connector board, and wherein the storing electrical characteristics comprises:
storing a respective associated connector bus speed for each of the plurality of connectors.

10. The method according to claim 9, wherein the bus speed is selected from the group including:
33 MHz bus clock speed;
66 MHz bus clock speed;
133 MHz bus clock speed;
10 mega-bytes per second data rate;
20 mega-bytes per second data rate;
40 mega-bytes per second data rate; and
80 mega-bytes per second data rate.

11. The method according to claim 3, wherein there are a plurality of connectors on the connector board, and wherein the storing electrical characteristics comprises:
storing a respective associated connector voltage for each of the plurality of connectors.

12. The method according to claim 11, wherein the voltage is selected from the group including:
3.3 volts;
5.0 volts; and
12.0 volts.

13. The method according to claim 1, wherein there is at least one electrical device coupled to a connector on the connector board, and wherein the method further comprises:
storing vital product parametric data associated with the electrical device in memory associated with the electrical device;
wherein the stored vital product parametric data associated with the electrical device can be accessed when needed.

14. The method according to claim 13, wherein the storing vital product parametric data associated with the electrical device comprises:
storing information about characteristics of the electrical device.

15. The method according to claim 14, wherein the storing information about characteristics of the electrical device comprises:
storing physical and electrical characteristics, including operational capabilities, of the electrical device.

16. The method according to claim 1, wherein the electrical system includes a chassis with at least one chassis slot for receiving an electrical chassis device therein, a chassis device including a power supply device or a cooling device, and wherein the method further comprises:
storing vital product parametric data in memory associated with the at least one chassis slot; and
accessing the stored vital product parametric data with the electrical system.

17. The method according to claim 1, wherein the vital product parametric data comprises at least one of:
concurrent maintenance data;
imbedded slot data;
unique capabilities data;
bus width data;
voltage data;
bus clock speed data;
long/short slot support data;
power data;
cooling data; and
pitch unit data.

18. In an electrical system having a connector board with at least one electrical connector thereon for receiving an electrical device therein, a method comprising:
storing vital product parametric data in memory associated with the connector board; and
accessing the stored vital product parametric data with the electrical system;
wherein the storing vital product parametric data comprises:
storing information about characteristics of the connector board and the at least one electrical connector;
wherein the storing information comprises:
storing physical and electrical characteristics of the connector board and the at least one connector;
wherein there are a plurality of connectors on the connector board, and wherein the storing physical characteristics comprises:
storing a respective associated available connector clearance for each of the plurality of connectors, the available connector clearance being dependent on characteristics of the connector board and one or more electrical device connected thereto.

19. In an electrical system having a connector board with at least one electrical connector thereon for receiving an electrical device therein, a method comprising:
storing vital product parametric data in memory associated with the connector board; and
accessing the stored vital product parametric data with the electrical system;
wherein there is at least one electrical device coupled to a connector on the connector board, and wherein the method further comprises:
storing vital product parametric data associated with the electrical device in memory associated with the electrical device;
wherein the stored vital product parametric data associated with the electrical device can be accessed when needed;
wherein the storing vital product parametric data associated with the electrical device comprises:
storing information about characteristics of the electrical device;
wherein the storing information about characteristics of the electrical device comprises:
storing physical and electrical characteristics, including operational capabilities, of the electrical device;
wherein the storing operational capabilities of the electrical device comprises:
storing concurrent maintenance information.

20. An apparatus comprising:
at least one electrical connector for receiving an electrical device; and
first memory associated with the at least one connector for storing vital product parametric data.

21. The apparatus according to claim 20, wherein the at least one connector has an electrical device received therein;
wherein the apparatus further comprises second memory associated with the received electrical device for storing vital product parametric data about the electrical device; and wherein the first memory receives and stores vital product parametric data about the electrical device read from the second memory.

22. The apparatus according to claim 20, wherein the vital product parametric data comprises at least one of:
concurrent maintenance data;
imbedded slot data;
unique capabilities data;
bus width data;
voltage data;
bus clock speed data;
long/short slot support data;
power data;
cooling data; and
pitch unit data.

23. In a computer system having an operating system and having a chassis with at least one chassis slot for receiving a chassis electrical device, at least one backplane having at least one backplane slot for receiving a backplane electrical device, an apparatus which provides respective chassis, backplane, and device parametric data, comprising:
chassis specific memory for storing chassis slot vital product data;
backplane slot vital product data memory disposed on the at least one backplane; and
device vital product data memory disposed on a respective electrical device received in one of the respective slots;
wherein each respective memory stores respective parametric data accessible by the computer system to check compatibility.

24. The apparatus according to claim 23, wherein the computer system has a system power control network which can access the respective parametric data from the respective memory.

25. The apparatus according to claim 23, wherein the parametric data comprises at least one of:
concurrent maintenance data;
imbedded slot data;
unique capabilities data;
bus width data;
voltage data;
bus clock speed data;
long/short slot support data;
power data;
cooling data; and
pitch unit data.

26. In a computer system having an operating system and having a chassis with at least one chassis slot for receiving a chassis electrical device, at least one backplane having at least one backplane slot for receiving a backplane electrical device, an apparatus which provides respective chassis, backplane, and device parametric data, comprising:
chassis specific memory for storing chassis slot vital product data;
backplane slot vital product data memory disposed on the at least one backplane; and
device vital product data memory disposed on a respective electrical device received in one of the respective slots;
wherein each respective memory stores respective parametric data accessible by the computer system to check compatibility;
wherein the computer system operating system stores hard-coded chassis, backplane, and device parametric data; and
wherein parametric data from an external data source can be accessed and compared with the computer to check compatibility using one of:
the hard-coded chassis, backplane, or device parametric data stored in the operating system; or
parametric data accessed from respective chassis slot vital product data memory, respective backplane slot vital product data memory, and respective device vital product data memory.

27. The apparatus according to claim 26, wherein the external data source comprises a remote computer data base.

28. The apparatus according to claim 27, wherein the remote computer data base comprises a site on the Internet.

29. The apparatus according to claim 28, wherein the parametric data comprises at least one of:
concurrent maintenance data;
imbedded slot data;
unique capabilities data;
bus width data;
voltage data;
bus clock speed data;
long/short slot support data;
power data;
cooling data; and
pitch unit data.

30. The apparatus according to claim 26, wherein the parametric data comprises at least one of:
concurrent maintenance data;
imbedded slot data;
unique capabilities data;
bus width data;
voltage data;
bus clock speed data;
long/short slot support data;
power data;
cooling data; and
pitch unit data.

* * * * *